United States Patent [19]

Wittenborg

[11] 4,388,338
[45] Jun. 14, 1983

[54] METHOD FOR PREPARING BEVERAGES IN PORTIONS

[75] Inventor: Poul E. Wittenborg, Odense, Denmark

[73] Assignee: A/S Wittenborgs Automatfabriker, Denmark

[21] Appl. No.: 251,109

[22] Filed: Apr. 6, 1981

Related U.S. Application Data

[63] Continuation of Ser. No. 31,998, Apr. 20, 1979, abandoned.

[30] Foreign Application Priority Data

Apr. 26, 1978 [DK] Denmark .............................. 1820/78

[51] Int. Cl.³ .......................... A23L 2/00; B65B 3/04
[52] U.S. Cl. ...................................... 426/590; 99/275;
141/102; 222/129.1; 426/593; 426/594;
426/597

[58] Field of Search ............... 426/506, 507, 590, 594,
426/593, 597; 141/9, 100, 102, 105; 99/275;
366/150, 167, 173, 182; 239/543, 422;
222/129.1

[56] References Cited

U.S. PATENT DOCUMENTS 2,588,591  3/1952  Thompson ............................ 99/275
2,743,047  4/1956  Clarke ................................. 141/100

Primary Examiner—Raymond N. Jones
Assistant Examiner—George C. Yeung
Attorney, Agent, or Firm—Hopgood, Calimafde, Kalil, Blaustein & Judlowe

[57] ABSTRACT

The present invention relates to a method and a device for preparing beverages such as coffee, tea and cocoa in portions in containers such as plastic cups, said containers being first partially filled with a pre-measured amount of flavored powder and thereafter filled up with water. According to the invention water is added under slight overpressure via a water outlet head (3) for partial filling of the container, during which pressure water is added via separate nozzle heads (4) to ensure thorough whipping of the flavored powder in the water.

6 Claims, 1 Drawing Figure

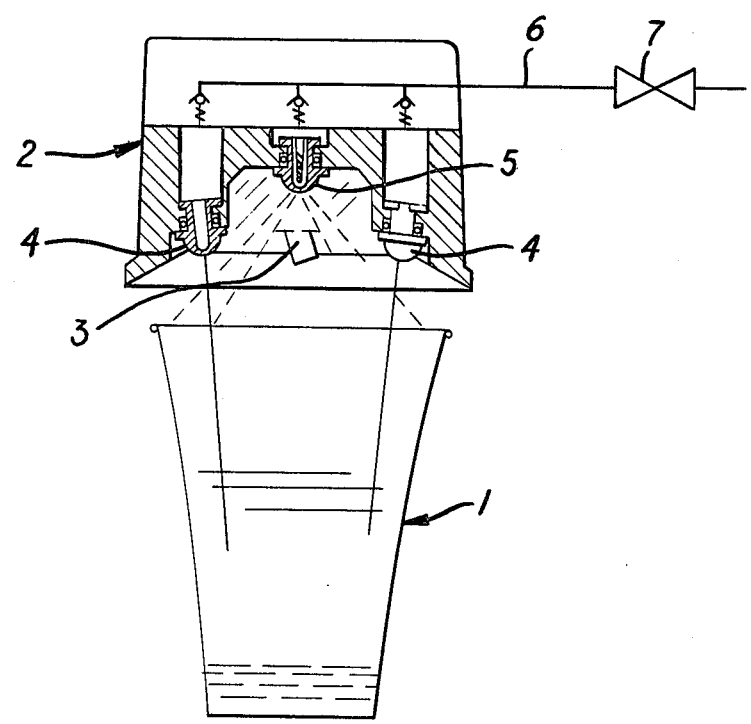

METHOD FOR PREPARING BEVERAGES IN PORTIONS

This is a continuation of application Ser. No. 31,998, filed Apr. 20, 1979, now abandoned.

The present invention relates to a method for preparing beverages such as coffee, tea and cocoa in portions, by which method a pre-measured amount of a flavored powder is added to a container, such as a plastic cup, whereafter the container is filled up with water, and a device for carrying out said method.

In known methods of perparing beverages in portions there are often problems involved in mixing to satisfaction the pre-measured amount of powder with the added water. Owing to the possibility of calcareous deposits in the pipes and in the water outlet openings, it has not been possible to solve this problem by increasing the pressure of the hot water.

The object of the invention is to provide a method for preparing beverages in portions, by which the pre-measured amount of powder is satisfactorily dispersed throughout and mixed in the added water so as to make maximum use of the capacity of the powder to be dissolved in a liquid.

This is achieved according to the invention by first filling the container partially with water under slight overpressure and by adding pressure water to the container while or immediately after the container is partially filled with water under slight overpressure for effectively mixing the liquid. By this means the pre-measured amount of powder is thoroughly dispersed throughout the added water, as the pressure water ensures thorough "whipping" of the powder in the water. Particularly in connection with the preparation of hot beverages, the hot water may be added under slight overpressure without causing operational disorders owing to calcareous deposits, as the whipping effect is achieved by means of cold pressure water.

According to the invention the adding of water under slight overpressure may be interrupted or reduced temporarily during the adding of pressure water. By this means an appropriate embodiment of the invention is achieved.

According to the invention the water added under slight overpressure and/or the pressure water may be conducted in such a direction that the liquid in the container is caused to circulate, thereby increasing the effectiveness of the mixing.

The pressure water may according to the invention preferably be added under a pressure of approx. 3–4 $kp/cm^2$.

Furthermore the pressure water may according to the invention make up 5–25% of the total amount of added water. As a result the powder is dispersed to great satisfaction in the water. When preparing hot beverages, preferably 5–15% pressure water is added, in which case the cold pressure water does not cause the hot water, which is added under slight overpressure, to be cooled to any great extent.

Moreover according to the invention a foam-subduing shower or spray of water may at the same time the pressure water is added and/or immediately thereafter be sprayed over the surface of the liquid and over any foam from the liquid that might be present in the container. As a result the formation of foam is greatly subdued during the preparatory process.

Furthermore according to the invention a shower or spray is sprayed over the surface of the liquid sufficient for rinsing down and dissolving any grains of flavored powder that might be present in the foam film so as to give the foam an appetizing, spotless appearance. As a result dissolution of the grains is expedited, a factor which is particularly desirable in the preparation of cold beverages.

The device for carrying out the method according to the invention comprises a container dispenser, a powder dispenser and a water supply means and is according to the invention characterized by a water outlet head having one or more water supply conduits for supplying water under slight overpressure, one or more water nozzle heads for supplying pressure water and a nozzle head for optional supplying of a shower or spary. By this means a device is achieved that is particularly well suited for carrying out the method according to the invention.

The nozzle heads may according to the invention be built in a single, replaceable unit. Consequently a device having a defective water outlet head can easily be made to function properly again by replacing the nozzle head.

According to the invention the water outlet head may have two nozzle heads for supplying pressure water, said nozzle heads being located diametrically opposite each other in relation to the central axis of the container and having a direction of outflow forming an angle of approx. 3°–15°, preferably 12°, with vertical, and in vertical projection forming an angle of approx. 5°–30°, preferably 25°, with a vertical plane extending through the center of the mouth of the two nozzle heads, the nozzle head discharging the spray being centrally located between the two nozzle heads situated diametrically opposite each other.

The water outlet head may according to the invention also contain two water supply conduits for supplying water under slight overpressure, the mouths of which are in the same way located diametrically opposite each other in relation to the central axis of the container and directed so that the outflowing water is made to circulate in the same direction as the direction in which pressure water is fed. As a result the preparation of the beverages is particularly fast and the powder is mixed thoroughly with the water resulting in quick dissolution of the grains.

The invention will be described below with reference to the drawing, which is a diagrammatic view of a vertical cross-section through a water outlet head in a device according to the invention while the device is filling a container with water by the method according to the invention.

The container 1 illustrated in the drawing in the form of a plastic cup is positioned by means of a container dispenser under a water outlet head 2 which is part of a water supply means in a vending machine for preparing beverages such as coffee, tea and cocoa in portions. By means of a powder dispenser (not shown) the cup is provided with a desired, pre-measured amount of flavored powder, possibly already before the cup is positioned under the water outlet head 2. The water outlet head comprises a water supply conduit 3 for supplying water under slight pressure and two nozzle heads 4 for supplying pressure water. Furthermore it has a single centrally located nozzle head 5 adapted to spray a shower or spray over the surface of the liquid supplied to the cup by means of the nozzle heads 4 and the water outlet conduit 3. All the nozzle heads as well as the water supply conduit are connected to supply sources by known means. As illustrated in the drawing the nozzle heads may be provided with water from the same source via a conduit 6 and a suitable regulating valve 7. Another alternative is to provide the nozzle 5 for supplying a shower or spray with the necessary amount of water independent of the other nozzle heads, so that the nozzle head 5 is only in use during the preparation of beverages that have a tendency to produce a great amount of foam.

The control system of the device is adapted so that when the device is activated, the cup provided with a pre-measured amount of flavored powder is supplied with water under slight overpressure via the water supply conduit 3 together with pressure water via the nozzle heads 4. The amount of pressure water is relatively small in relation to the amount of water supplied under slight overpressure. When a hot beverage of approx. 150 ml is being prepared the pressure water may, for example, comprise 20 ml cold water. The pressure water may comprise 0-25% of the total amount of added water, depending upon the type of flavored powder, preferably 5-25% of the total amount. If a particularly foam-forming beverage is to be prepared, the control system of the device ensures that a spray of water is sent from the nozzle head 5.

In a preferred embodiment of the invention the water outlet head 2 has two nozzle heads 4 for supplying pressure water, the nozzle heads being located diametrically opposite each other in relation to the central axis of the container and having a direction of outflow forming an angle of approx. 3°-15°, preferably 12°, with vertical and in vertical projection forming an angle of approx. 5°-35°, preferably 25°, with a vertical plane extending through the center of the mouth of two nozzle heads. The nozzle head discharging the spray may be centrally located between the two nozzle heads situated diametrically opposite each other. The nozzle heads 4 for supplying pressure water may, however, be positioned in any other direction that causes the water in the cup to circulate. The nozzle head may also have several water supply conduits 3, and the direction of outflow of the conduits may also be adapted so that the water in the cap circulates as a result of the direction of the water outflow.

The invention has been described with reference to a particular embodiment.

Many changes may be made without deviating from the spirit and scope of the invention as set forth in the appended claims. For instance, the nozzle heads and water supply conduits may be constructed in a single unit, thus facilitating the replacement of such a unit. Furthermore the control system of the device may be adapted so that a different number of nozzle heads and water supply conduits are coupled in, depending upon the type of beverage to be prepared.

Especially during the preparation of cold beverages, the grains of flavored powder become trapped in a film of foam, thus preventing the grains from being dissolved in the liquid. In order to avoid this, the control system of the device may be adapted to start a shower or spray when the preparation of such beverages is known to be encumbered with such a drawback. In such a case the amount of shower or spray may be adjusted to be sufficient for rinsing down and dissolving the grains in the liquid, while preserving the foam. As a result the prepared beverage has an appetizing, spotless appearance.

I claim:

1. A method for preparing beverages at ambient pressures, comprising
    (a) adding a premeasured amount of flavored powder to a container;
    (b) partially filling said container with a first quantity of water introduced into said container through at least one water supply outlet at a first velocity and a first mass rate of flow; and
    (c) substantially simultaneous with step (b), introducing a second quantity of water at a second velocity, which velocity is higher than said first velocity, and a second mass rate of flow, said second mass rate of flow being lower than said first mass rate of flow, through at least one nozzle to substantially fill said container and effectively mix said powder and water to produce a beverage, wherein the diameter of said outlet is larger than the diameter of said nozzle whereby the velocity of said second quantity of water is sufficient to intensively mix by whipping said water and said flavored powder within said container.

2. The method of claim 1 wherein the first quantity of water is added in such a way that the beverage within said container is caused to circulate.

3. The method of claim 1 wherein the pressure of the second quantity of water is about 3-4 Kp/cm$^2$.

4. The method of claim 1 wherein said second quantity of water comprises about 5-25% of said prepared beverage.

5. The method of claim 1 which further includes the step of spraying a third quantity of water over the surface of the liquid to subdue any foam formed thereon.

6. The method of claim 5 wherein the sprayed third quantity of water is sufficient to dissolve any grains of flavored powder present in the foam.

* * * * *